United States Patent [19]

Barrow et al.

[11] Patent Number: 5,062,686
[45] Date of Patent: Nov. 5, 1991

[54] OPTICAL SENSORS AND OPTICAL FIBRE NETWORKS FOR SUCH SENSORS

[75] Inventors: Ross Barrow, Noble Park North; Martin C. Elias, O'Connor; Peter R. A. Lyons, Kaleen; Peter G. Jacob, Gilmore; Scott C. Rashleigh, Wanniassa, all of Australia

[73] Assignee: Commonwealth of Australia, Australian Capitan Territory, Australia

[21] Appl. No.: 259,120

[22] PCT Filed: Nov. 26, 1987

[86] PCT No.: PCT/AU87/00399
§ 371 Date: Sep. 23, 1988
§ 102(e) Date: Sep. 23, 1988

[87] PCT Pub. No.: WO88/04065
PCT Pub. Date: Jun. 2, 1988

[30] Foreign Application Priority Data

Nov. 27, 1986 [AU] Australia .......... PH9203/86

[51] Int. Cl.⁵ .................. G02B 6/02; G02B 6/16
[52] U.S. Cl. .................. 385/33; 385/15; 385/123
[58] Field of Search ........... 350/96.15, 96.18, 96.29

[56] References Cited

U.S. PATENT DOCUMENTS

| | | | |
|---|---|---|---|
| 4,176,551 | 12/1979 | Hammer | 73/339 |
| 4,437,761 | 3/1984 | Kroger | 356/44 |
| 4,523,092 | 6/1985 | Nelson | 250/277 |
| 4,575,259 | 3/1986 | Bacci et al. | 374/130 |
| 4,594,504 | 6/1986 | Coursolle et al. | 250/227 |
| 4,649,271 | 3/1987 | Hok | 250/277 |
| 4,652,143 | 3/1987 | Wickersheim | 374/161 |
| 4,673,299 | 6/1987 | Dakin | 374/131 |

FOREIGN PATENT DOCUMENTS 0146522 6/1985 European Pat. Off. .

Primary Examiner—William L. Sikes
Assistant Examiner—Robert E. Wise
Attorney, Agent, or Firm—Sterne, Kessler, Goldstein & Fox

[57] ABSTRACT

An optical sensor includes elongate light transmission means such as an optical fibre (13). A lens (16) of at least nearly half-pitch length is positioned with one of its focal planes substantially at a mouth (13a) of the optical fibre to receive and focus a diverging cone of light emergent therefrom. A reflector (20) is disposed substantially at another focal plane of the lens to reflect the focused light back to the mouth of the fibre. Detection means (14) in the path of the light between the mouth and the reflector is arranged to influence the light in response to an external condition in a manner whereby the reflected light received back at the fibre mouth may be monitored to detect the influence and thereby the condition. An optical fibre network has an incident fibre (40) and a detection fibre (42) coupled to plural optical components (60) via respective optical fibres (62) associated with the components and one or more optical fibre couplers (64, 68, 69). The network further includes means (44) to transmit along the incident fibre incident signals of close but discrete wavelengths, and means (82) associated with each of said respective optical fibres (62) to reflect a portion of each of the signals back along the fibre as a respective reference signal.

24 Claims, 3 Drawing Sheets

OPTICAL SENSORS AND OPTICAL FIBRE NETWORKS FOR SUCH SENSORS

FIELD OF THE INVENTION

This invention relates generally to optical sensors, that is to sensors in which the output is an optical signal, and is also separately concerned with optical fibre networks for monitoring such sensors.

BACKGROUND ART

A number of sensors have been proposed in which the output signal is transmitted along an optical fibre. In some cases, the fibre itself is used as the transducer element, while others use an optical effect.in a material which is addressed by an optical fibre to enable that effect to be sensed. The latter group includes mechanical shutter/mirror configurations, for example U.S. Pat. No. 4,547,728, and devices using optically active liquid crystals. Grattan et al (Rev Sci. Instrum 57 (6), 1175) have described a sensor using a transducer constructed from a piece of doped glass whose absorption profile is measurably temperature-dependent over a range of interest. The device operates in a transmission configuration and also utilizes a piece of neodymium glass to generate a reference wavelength. U.S. Pat. No. 4,671,651 to Toyoda et al proposes the use of the semiconductor compound $CdInGaS_4$ which absorbs various amounts of light of specific frequencies as a function of temperature.

A serious disadvantage of transmission mode sensors of this type is the great accuracy required in their construction to ensure that the parts are closely enough aligned that at least an adequate proportion of the light received from the incident fibre reaches the endface of the detection fibre. The problem remains if the device is converted to reflection mode in which a single fibre transmits both the incident and detected light: see, e.g., the aforementioned U.S. Pat. No. 4,671,651 and U.S. Pat. No. 4,689,483 to Weinberger. In this case, even slight misalignment of the reflector, which can easily arise during assembly or in use, can seriously diminish or eliminate the received signal.

U.S. Pat. No. 4,575,259 to Bacci et al discloses a slightly different arrangement, viz an optical fibre thermometer that utilizes the temperature dependent absorption characteristics of a thermochromic solution. Light enters the sensing probe by way of a first optical fibre after which it passes through the thermochromic solution and is reflected by a reflective substance. Some of the reflected light is captured by a second fibre which is connected to either a beam splitter or a star coupler to form two separate beams of light. The beams of light are then routed to separate filters and photodetectors for comparison and ultimate calculation of the temperature.

U.S. Pat. No. 4,673,299 to Dakin discloses a temperature sensing assembly that includes a doped optical fibre that absorbs transmitted light as a function of temperature. Unlike the previously described references, the Dakin apparatus does not use a reflective surface to return the incident light. Instead, naturally occurring back-scattered light is routed to a wavelength separator and detection elements. Respective lasers produce light of different wavelengths to compensate for any variation in dopant concentration. By comparing the detector reading with the time it is detected, it is possible to obtain the temperature at any location along the optical fibre. A second embodiment presents a similar design with the exception that one laser is used in conjunction with a light-emitting fibre and a wavelength filter. The sensing fibre is doped with a material that partially absorbs the incident light and in turn produces fluorescent light covering two wavelength bands. The wavelength filter separates these bands and the relative intensities are compared with a ratiometer.

Back-scattering, in this case from a matrix of randomly distributed chips of semiconductor crystals, is also relied upon in U.S. Pat. No. 4,288,159. U.S. Pat. No. 4,652,143 to Wickersheim et al discloses a temperature measurement apparatus in which a surface of interest is coated with a temperature sensitive luminescent material. When excited by incident light from a pulse generator and lamp, the luminescent material emits light of a particular wavelength. Some of this light is captured by the same optical fibre and this light is routed to a detector. Other types of optical temperature probe are disclosed in U.S. Pat. Nos. 4,176,551 to Hammer et al and 4,437,761 to Kroger.

U.S. Pat. No. 4,566,753 discloses an optical coupler in which a graded index rod lens (GRIN lens) is used as the medium through which the fibres are coupled. Three fibres are coupled to three other fibres. Each fibre possess a tapered portion that is centrally connected to the respective end faces of the GRIN lens. The advantage of using the GRIN lens is that a high quality coupling is achieved without the need for accurate relative alignment of the fibre optic cables.

The need to optimise collection of the signal at the return fibre-becomes all the more critical when the sensor is being employed as one of several sensors in an optical fibre network. Such networks have been proposed in which single incident and detection fibres are communicated to multiple optical components. e.g. sensors, by means of an ordered fibre tree assembled with fibre optic couplers. Since substantial attenuation occurs and inevitable losses arise as each signal traverses the tree out to each sensor and back again, including typically half-power attenuation on each branch of each coupler, it is desirable that further losses be minimised at each sensor.

A known technique for distinguishing returning pulses in networks of the kind just mentioned relies on time separation of the pulses arising from distinct lengths of fibre to each sensor. However, in and out transit times and amplitudes are also affected by ambient conditions, especially temperature: in order to enhance sensitivity and reduce the frequency of recalibration, it has been proposed that the incident light comprise alternate signals of close but discrete wavelengths, one comprising the test wavelength and the other a reference wavelength. Such is described, e.g., in U.S. Pat. No. 4,673,299 to Dakin. Differential analysis is then employed to reduce the effect of ambient conditions. However, the present inventors' experience is that ambient conditions still unduly influence results and result in an accuracy below the level desired for many practical applications of optical fibre networks.

U.S. Pat. No. 4,409,476 discloses a temperature measuring apparatus that utilizes a number of remotely placed optical temperature sensors. A drive unit operates a number of light emitting diodes (LEDs) that send light pulses to the temperature sensors. The temperature sensors contain a temperature-sensitive photoluminescent material which emits light of a particular wavelength when excited by incident light. The emitted light is routed to a receiver unit that measures the intensity of the light for the eventual calculation of temperature.

SUMMARY OF THE INVENTION

It is an object of the invention to provide an improved optical sensor for use with optical fibres which does not require highly accurate manufacturing or assembly techniques.

The invention accordingly provides an optical sensor which includes elongate light transmission means such as an optical fibre. Lens means of at least nearly half-pitch length is positioned with one of its focal planes substantially at a mouth of the light transmission means to receive and focus a diverging cone of light emergent therefrom. Reflector means is disposed substantially at another focal plane of the lens means to reflect the focused light back to the mouth of the light transmission means. Detection means in the path of the light between the mouth and the reflector means is arranged to influence the light in response to an external condition in a manner whereby the reflected light received back at the mouth may be monitored to detect the influence and thereby the condition.

The lens means advantageously comprises one or more segments of graded index lenses, for example of cylindrical configuration.

In one embodiment, the detection means is sandwiched between the lens and the reflector. Alternatively, the detector may be sandwiched between respective lens segments each of substantially quarter-pitch length.

The sensor preferably further includes an outer protective tube about the lens means and a non-rigid filling between the tube and the lens means which allows relative minor movements of the lens means with respect to the tube.

The detection means may vary according to the application of the sensor. It may, for example, comprise a temperature-sensitive absorption filter, such as a selected Schott glass, whereby the sensor is a temperature sensor, or a pair of spaced opposed polarizer discs mounted coaxially to respond to a displacement by rotating about their axis relative to each other.

The invention further extends to an optical fibre network comprising an incident fibre and a detection fibre coupled to plural optical components, e.g. sensor means, via respective optical fibres associated with the components and one or more optical fibre couplers. The network further includes means to transmit along the incident fibre incident signals of close but discrete wavelengths. Means is associated with each said respective optical fibres to reflect a portion of each incident signal back along the fibre as a respective reference signal.

BRIEF DESCRIPTION OF THE DRAWINGS

The invention will be further described, by way of example only, with reference to the accompanying drawings, in which.

BEST MODES FOR CARRYING OUT THE INVENTION

Figure 1:
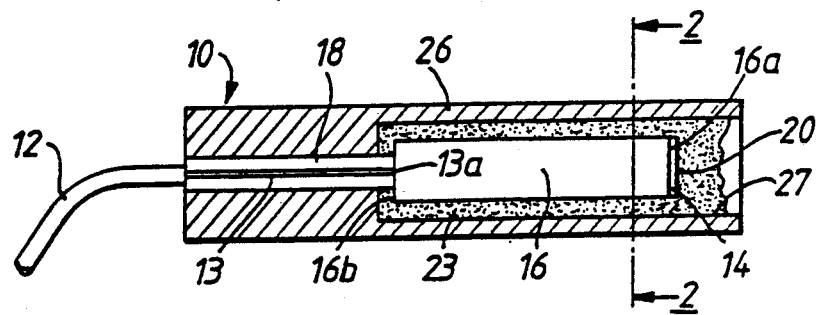
FIG. 1 is an axial cross-sectional view of a first embodiment of optical temperature sensor rn accordance with the invention.
Figure 2:
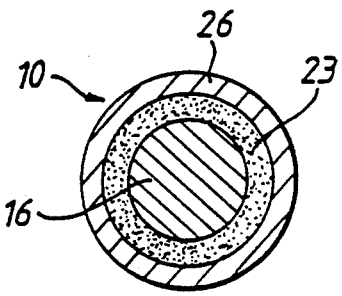
FIG. 2 is a cross-section on the line 2—2 in FIG. 1.

The temperature sensor 10 illustrated in FIGS. 1 and 2 is shown secured to the end of a length of optical fibre cable 12 which serve to transmit both the incident and reflected signals. Sensor 10 includes a detection element 14 disposed at one end 16a of an optical element in the form of a cylindrical graded index (GRIN) lens 16. Fibre 13 of cable 12 is most suitably a multi-mode fibre and has a stripped end which is held in a cylindrical ferrule 18. Ferrule 18 positions the fibre to direct incident light from the fibre into the other end 16b of lens 16 and to receive reflected light from the lens. Element 14 is a disc with one major face in contact with the end 16a of the lens, and the other major face provided with reflector means formed by a hard dielectric reflective coating 20 on the outside of the disc.

Ferrule 18, lens 16 and detection element 14 are secured in coaxial sequence by adhesive epoxy resin within a protective metal tube 26. Tube 26 is closed at one end by ferrule 18 but open at the other end to expose detection element 14 to surrounding conditions. The tube is counterbored at 27 as shown so that an annular gap separates tube 26 from lens 16 and detection element 14. The counterbore 27, and thus the gap, is filled with a non-rigid thermally conductive filling 23 selected to allow relative minor movement of the lens/detection element assembly with respect to the tube, e.g. due to thermal expansion of components or distortion of the tube. A suitable filling for this purpose is a thermally conductive jelly or grease such as a silicone.

Detection element 14 comprises an absorption filter which is temperature sensitive over the temperature range of interest. A suitable filter for common industrial applications in the range 0° to 400° C. is a disc of doped glass such as RG830 Schott glass (Schott is a Trade Mark) of thickness a little less than 1 mm in the axial direction. Suitable incident radiation for the sensor then has a test wavelength $\lambda_1$ of 830 nm, the half-transmission wavelength of the Schott glass at room temperature, while appropriate reference light is of wavelength $\lambda_R$, e.g. 904 nm, at which the selected Schott glass exhibits almost 100% transmission over the mentioned temperature range.

Reflection coating 20 is selected as a hard dielectric coating of maximum reflection at both these wavelengths. Alternate measurement at both wavelengths allows a differential determination which minimises the effect on the result of extraneous environmental or ambient variables, as previously discussed.

Graded index lens 16 is of almost half (0.5) pitch and is arranged so that one of its focal planes is at end 16b, i.e. substantially at the mouth 13a of fibre 13 to receive and focus a diverging cone of light emerging from the fibre. The other focal plane is substantially at reflection coating 20 so that the latter will reflect the focused light back to the mouth of fibre 13. A suitable graded index lens for this application, having a parabolic refractive index profile Type S20-025-083NC is manufactured by Nippon Sheet Glass.

Incident light emerging from the mouth of fibre 13 is first collimated then focused by lens 16 to form an image of the fibre mouth on reflective coating 20, which reflects the light back through lens 16 for receipt by the mouth of fibre 13. During both traversals, the light passes through disc 14, which influences the light in response to an external condition, in this case temperature, so that the reflected light received back at the mouth of the fibre may be monitored to detect the influence and thereby the condition. More particularly, the light will be attenuated by the filter disc 14 according to the known temperature dependent transmission profile of the filter at the test wavelength of 830 nm.

Figure 3:
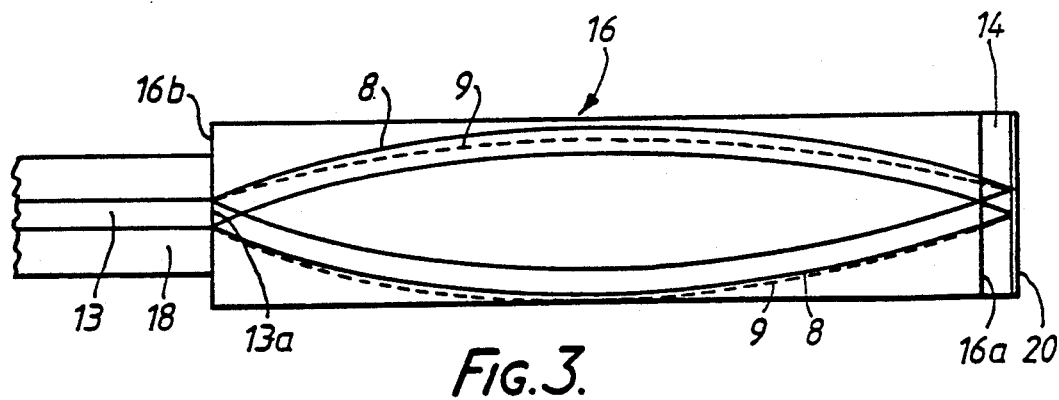
FIG. 3 is an optical ray diagram for the sensor.

Lens 16 has the particular property that even if its arrangement with respect to filter disc 14, fibre 13 and/or coating 20 is not precisely accurate as to angular or positional alignment, light traversing the filter disc will still be focused back to its original source at the fibre end of lens 16 with low loss. This is demonstrated in FIG. 3, in which full ray lines 8 depict the ideal case in which the incident and reflected light envelopes, determined by the fibre's cone of emergence, are co-incident. If, say, reflective coating 20 is not quite perfectly aligned, i.e. it is an angle slightly different from 90° to the axis of the sensor, the reflected light envelope is not coincident with the incident envelope and might be as shown by broken ray lines 9. However, because the reflection occurs at a focal plane and the fibre mouth is at the other, the reflector light will still focus at the fibre mouth. There will of course be some loss as the cone of light does not exactly match the fibre's cone of acceptance, but this is only a second order dependence on misalignment. The first order effect of misdirected reflections, which can result in loss of the whole signal at very small misalignments, is corrected by the lens and converted to the second order fault of mismatching with the cone of acceptance for the fibre.

Figure 4:
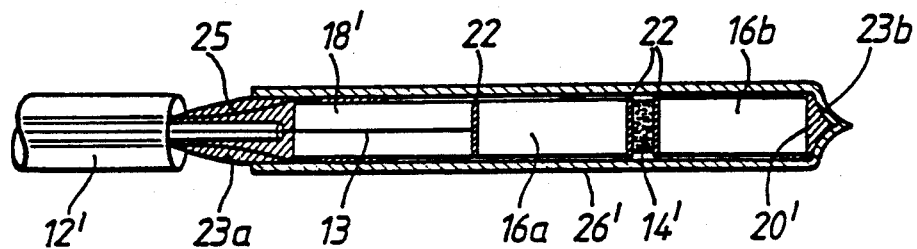
FIG. 4 is an axial cross-sectional view of a second embodiment of optical temperature sensor in accordance with the invention.

FIG. 4 depicts a second embodiment of temperature sensor 10' according to the invention, in which the GRIN lens 16 has been divided into two GRIN lense segments 16a, 16b of quarter-pitch length. In this case, the filter disc 14 is sandwiched between the lens segments and the reflective coating 20' is on the outer end face of lens segment 16b. The operation of this arrangement is in substance the same as that of FIGS. 1 and 2: the light simply traverses the filter disc at different points in its out and back paths. The second embodiment is also housed more strongly for harsher applications: resin interfaces 22 and resin plugs 23a, 23b secure and position the lens segment filter assembly within protective tube 26', which is closed, and several strands 25 of a suitable strengthening filament extend into resin plug 23a from the body of cable 12.

Figure 5:
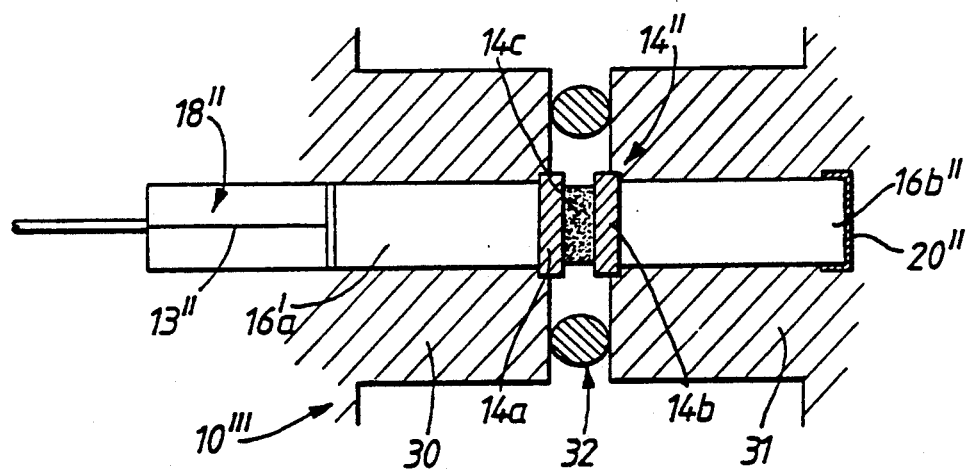
FIG. 5 is a schematic view of an optical displacement sensor in accordance with the invention.

FIG. 5 depicts, highly schematically, a third embodiment of optical sensor 10" in accordance with the invention which is suitable for monitoring displacement, especially a rotational displacement. The sensor again includes quarter-pitch graded index lens segments 16a", 16b", a dielectric reflective coating 20", and an optical fibre 13" for input and output light. In this case, instead of a static absorption filter as before, the detection element 14" comprises a pair of polarizer discs 14a, 14b secured by epoxy resin to the respective adjacent end faces of the lens segments. Polarizer discs 14a, 14b are axially spaced and the respective lens/disc pairs are not fixed with respect to each other but are mounted for relative axial rotation in respective collars 30, 31 coupled by a bearing 32. The space between the discs is filled by an index matching gel 14c. The polarization planes of the discs 14a, 14b are set at 90° to each other at a zero-movement equilibrium position, at which the discs will thereby prevent transmission of any light.

A suitable material for the polarizer discs is the plastic laminate polarizer Polaroid HN32 (Trade Mark) marketed by Polaroid Corporation.

Typically, one of collars 30, 31 is fixed in position and the other rotates in response to a displacement which it is desired to accurately monitor. Unpolarized incident light is applied to lens 16a'" from fibre 13" and travels as before through lens segment 16a'", polarizer discs 14a, 14b, back from reflective surface 20" through the lens segments and polarizer discs to the mouth of fibre 13". The amplitude of the detected light depends upon the relative rotational positions of discs 14a, 14b: as the angle between the polarization planes reduces from 90°, the amplitude of the detected light correspondingly increases from zero. The amplitude is thus a measure of the relative angular displacement of the discs, and thereby of the displacement to which the discs are responsive.

As with the first embodiment, it is preferred that incident light of alternate wavelengths comprising a test wavelength $\lambda_1$ and a reference wavelength $\lambda_R$ is applied to the sensor. The wavelengths should be reasonably close so as to optimise the elimination of ambient effects but should also be selected to maximise the size and variation of differences in amplitudes over the displacement range of interest. More particularly, the wavelengths are chosen so that the variation in amplitude at $\lambda_R$ is much less than that for $\lambda_1$ as the relative angular positions of the polarizer discs change. It is found that $\lambda_1$ tends to be shorter than $\lambda_R$. For Polaroid HN32 polarising discs, suitable values are $\lambda_1 = 830$ nm and $\lambda_R = 904$ nm.

Figure 6:
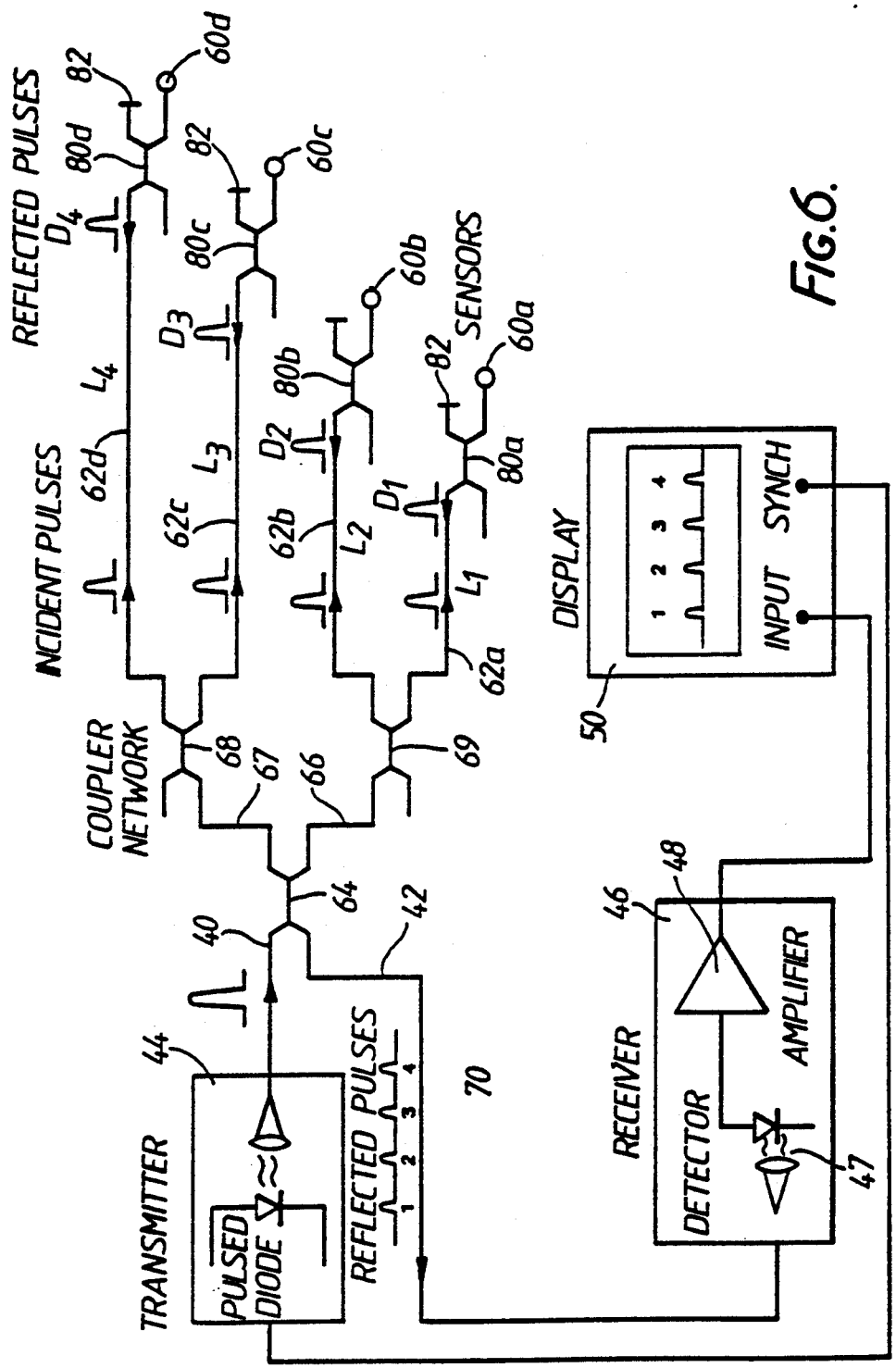
FIG. 6 is a diagram of an optical fibre network accord to the invention.

FIG. 6 depicts an optical fibre network by which multiple optical sensors of the kind exemplified by FIGS. 1, 4 and 5 may be activated and monitored using single incident and detection fibres 40, 42 respectively connected to a suitable pulsed-diode transmitter 44 and to a receiver 46. The receiver typically includes a photodetecter 47 and an amplifier 48 associated with a display 50. Fibres 40, 42 are optically coupled to, for example, four sensors 60a, 60b, 60c, 60d each having an associated respective incident optical fibre 62a, 62b, 62c, 62d via a first fibre-optic biconical coupler 64, which couples fibres 40, 42 to first branches 66, 67, and a further pair of biconical couplers 68, 69 which divide branches 66, 67 between the four sensor fibres. If sensor fibres 62a-62b are varying length L1-L4, the detection pulses D1-D4 returned along fibres 62a-62d will traverse fibre 42 as a train 70 of time-separated received pulses R1-R4. They can therefore be distinguished by time-based analysis.

Couplers 64, 68, 69 ideally exhibit 50% coupling factors: it will be appreciated that the amplitude of each pulse will be more than halved, allowing for losses, at each traversal of a coupler and will also exhibit some losses along each fibre. The greater the network, the greater will be the pulse attenuation between transmission and reception. In order to enhance the sensitivity and substantially eliminate the need for regular calibrations to allow for changes in ambient conditions, for example in temperature, which may affect the in and out transit times and amplitudes of the pulses, two devices may be adopted for effecting differential monitoring.

The first has already been mentioned, viz the transmission of alternate signals of close but discrete wavelengths, one comprising the test wavelength and the other a reference wavelength. The second device, which assists in ratioing out conditions along each sensor fibre 62a–62d, is the generation of a local reference pulse for each sensor 60a–60d by providing a further set of couplers 80a–80d in the sensor fibres 62a–62d close to the sensors. One branch of each coupler 80 is connected to the sensor while the other terminates at a reflector 82. This reflector returns the desired local reference pulse to the receiver within a short time interval of the associated detection pulse from the sensor. Excellent accuracy, with substantial independence from ambient and environmental factors such as temperature, coupler losses and coupling factors, fibre losses and lengths, and differences between amplitudes of successive pulses from the optical transmitter 44, is obtained by determining the ratio between the amplitude of each detection pulse and associated local reference pulse at each wavelength, and then determining the ratio between those two values. Accuracy may be substantially further improved by averaging the final ratio over multiple sets of detected pulses.

We claim:

1. An optical sensor comprising:
   elongate light transmission means;
   lens means of at least substantially half-pitch length, positioned with one of its focal planes substantially at a mouth of the light transmission means to receive and focus a diverging cone of light emergent therefrom;
   reflector means substantially at another focal plane of said lens means to reflect said focused light back to said mouth of the light transmission means; and
   detection means in the path of said light between said mouth and said reflector means, said detection means being responsive to an external condition to influence said diverging cone of light.

2. An optical sensor according to claim 1 wherein said lens means comprises at least one segment of a graded index lens.

3. An optical sensor according to claim 1 wherein said detection means is sandwiched between the lens means, and the reflector means.

4. An optical sensor according to claim 1 wherein said lens means comprises a plurality of segments of graded index lens, said detection means sandwiched between respective lens segments comprising said lens means and each of said lens segments are substantially quarter-pitch length.

5. An optical sensor according to claim 1 further comprising an outer protective tube about said lens means and a non-rigid filling between the tube and the lens means which allows relative minor movements of the lens means with respect to the tube.

6. An optical sensor according to claim 1 wherein said elongate light transmission means comprises an optical fibre and means to enclose and locate a terminal portion of the fibre ending at said mouth.

7. An optical sensor according to claim 6 wherein said lens means, reflector means, detection means, said tube and said ferrule are axially symmetrical and co-axial.

8. An optical sensor according to claim 6, wherein said means to enclose and locate said terminal portion of the fibre is a ferrule within said tube.

9. An optical sensor according to claim 1 wherein said lens means, reflector means, and detection means are axially symmetrical and co-axial.

10. An optical sensor according to claim 1 wherein said reflector means is a coating on a face of one of the lens means and detection means.

11. An optical sensor according to claim 1 wherein the detection means is a temperature-sensitive absorption filter and, wherein the sensor is a temperature sensor.

12. An optical sensor according to claim 1 wherein the detection means is a pair of spaced opposed polarizer disc mounted co-axially to respond to a displacement by rotating about their axis relative to each other.

13. An optical sensor according to claim 1 wherin said detection means is temperature sensitive.

14. An optical fibre network comprising:
   an incident fibre and a detection fibre coupled to plural optical components via respective sensor optical fibres associated with the components and at least one optical fibre coupler, said respective sensor optical fibres with varying lengths;
   means to transmit incident signals along said incident fibre and then via said coupler(s) along said sensor optical fibres to said components; and
   respective means associated with each of said sensor optical fibres to reflect a portion of each said incident signals back along the respective sensor optical fibres and then said detection fibre as a respective reference signal, said respective reference signal comprising a train of time-separated pulses, each of said pulses corresponding to one of said incident signals, said pulses being analyzed collectively to determine an external condition.

15. An optical fibre network according to claim 14 wherien each of said respective optical fibres is connected to an input port of an optical fibre coupler, the output ports with respect to said input port being connected respectively to a respective said optical component and a respective said reflection means, the coupler being closer to the optical component relative to the network as a whole.

16. An optical fibre network according to claim 15 wherein said optical components comprise optical sensors.

17. An optical fibre network according to claim 16 where at least oen of the optical sensors comprise:
   elongate light transmission means;
   lens means of substantially half-pitch length, positioned with one of its focal planes substantially at a mouth of the light transmission means to receive and focus a diverging cone of light emergent therefrom;
   reflector means substantially at another focal plane of said lens means to reflect said focused light back to said mouth of the light transmission means; and
   detection means in the path of said light between said mouth and said reflector means, said detection means being responsive to an external condition to influence said diverging cone of light.

18. An optical sensor comprising:
   elongate light transmission means;
   lens means fixed with respect to a mouth of said light transmission means, being positioned with one of its focal planes substantially at said mouth to receive and refract a diverging cone of light emergent therefrom;
   reflector means fixed with respect to said lens means to reflect said refracted light back to said mouth of the light transmission means; and detection means in the path of said light between said mouth and said reflector means, said detection means being responsive to an external condition to influence said light between said mouth and said reflector means.

19. An optical sensor according to claim 18, wherein said lens means comprises at least one segment of a graded index lens.

20. An optical sensor according to claim 18, further comprising an outer protective tube about said lens means and a non-rigged filling between the tube and the lens means which allows relative minor movements of the lens means within said tube.

21. An optical sensor according to claim 18, wherein said elongate light transmission means comprises an optical fibre and means to enclose and locate a terminal portion of the fibre ending at said mouth.

22. An optical sensor according to claim 21, wherein said means to enclose and locate said terminal portion of said fibre is a ferrule within said tube.

23. An optical sensor according to claim 18, wherein said reflector means is a coating on a face of one of the lens means and detection means.

24. An optical sensor according to claim 18, wherien the detection means is a temperature sensitive absorption filter, wherein the sensor is as temperature sensor.

* * * * *